United States Patent
Cesaroni et al.

[19]

[11] Patent Number: 6,079,202
[45] Date of Patent: Jun. 27, 2000

[54] RELOADABLE/MODULAR SOLID PROPELLANT ROCKET MOTOR

[76] Inventors: Anthony J. Cesaroni, 9 Heathmore Court, Unionville, Ontario, Canada, L3R 8J1; Scott Bartel, 3179 Roosevelt St., Carlsbad, Calif. 92008; Korey R. Kline, 7290 SW. 42nd St., Miami, Fla. 33155-4506

[21] Appl. No.: 09/062,384

[22] Filed: Apr. 17, 1998

[51] Int. Cl.[7] .................................................. F02K 9/32
[52] U.S. Cl. .............................................. 60/263; 102/282
[58] Field of Search ............................. 60/253; 102/282

[56] References Cited

U.S. PATENT DOCUMENTS

| | | | |
|---|---|---|---|
| 3,125,955 | 3/1964 | Estes | 102/34.2 |
| 3,248,873 | 5/1966 | Pase . | |
| 3,442,083 | 5/1969 | Klotz | 60/229 |
| 3,787,013 | 1/1974 | McKenzie, Sr. . | |
| 4,432,202 | 2/1984 | Betts et al. | 60/221 |
| 4,493,240 | 1/1985 | Norton . | |
| 4,574,700 | 3/1986 | Lewis | 102/287 |
| 4,602,480 | 7/1986 | Hill et al. | 60/253 |
| 5,004,186 | 4/1991 | Hans et al. . | |
| 5,036,658 | 8/1991 | Tate | 60/253 |
| 5,054,397 | 10/1991 | Hans et al. . | |
| 5,123,355 | 6/1992 | Hans et al. . | |
| 5,212,946 | 5/1993 | Hans et al. | 60/253 |
| 5,398,498 | 3/1995 | Mort et al. | 60/223 |
| 5,507,231 | 4/1996 | Moore et al. | 102/374 |
| 5,579,636 | 12/1996 | Rosenfield . | |

OTHER PUBLICATIONS

"High–Power RMS Reloadable Motor System"; AeroTech, Inc. Informational Pamphlet; Feb. 5, 1997; 4 pages.

*Primary Examiner*—Timothy S. Thorpe
*Assistant Examiner*—Ehud Gartenberg
*Attorney, Agent, or Firm*—Majestic, Parsons, Siebert & Hsue P.C.

[57] ABSTRACT

A modular rocket motor having a cylindrical housing with one end having an inwardly curved rim and the other end having internal threads. A heat-resistant plastic liner and a threaded nozzle cap are slidingly insertable with the cylindrical housing, with the threaded nozzle cap mating with the internal threads of the cylindrical housing. The motor is threaded into a rocket frame. A nozzle cap with liner attached thereto for a modular rocket motor that is colour coded to indicate the performance classification of the rocket motor.

14 Claims, 5 Drawing Sheets

RELOADABLE/MODULAR SOLID PROPELLANT ROCKET MOTOR

FIELD OF THE INVENTION

The present invention relates to a modular solid fuel (solid propellant) rocket motor, especially to such motors for use in rockets that are particularly intended for recreational, educational and professional use. In particular, the invention relates to modular rocket motors which may be assembled with solid propellant grain, fired, recovered, easily cleaned and re-assembled with propellant grain for further use (firing) by the user.

BACKGROUND TO THE INVENTION

Disposable solid fuel rocket motors are known, but such motors are inherently subject to a variety of potential problems, including issues of safety, environmental pollution resulting from improper disposal of spent or used motors and the additional cost associated with the need to use new parts for the next firing of the motor.

A rocket motor which may be reloaded and reused is disclosed in U.S. Pat. No. 5,212,946 of Paul C. Hans et al, which issued May 25, 1993. Such a motor is stated to be of modular design, and to permit the user to vary the performance of the motor by using interchangeable nozzles of various designs, different length casings, diverse propellant charges and sizes, different ejection charge delays and different ejection charge power.

In assembly of a typical modular rocket motor, propellant grains are inserted into a liner. The propellant grains are solid and in the form of a right cylindrical column with a central bore i.e. with an axial orifice through the column of propellant grains. Typically, one or more propellant grains are inserted end-to-end into the liner, which is of an appropriate length with respect to the number of propellant grains being inserted. The liner is formed of cardboard, and is not intended to be re-used in subsequent firings of the rocket motor.

The liner with inserted propellant grain is inserted into a motor casing and sealed against pressure leaks using a plurality of O-rings. A nozzle system is inserted in one end of the casing, and a forward closure assembly having a delay charge for activation of a parachute system is inserted into the other end of the casing.

While such a system is useful, it typically requires substantial effort in order to clean the motor casing after use, particularly including difficulties in removing all of the charred remains of the liner and residues of propellant grain from the casing so that a new liner may be inserted on reloading of the casing. In addition, typical reloadable motor systems have a significant number of parts, including O-rings, which makes shipping, assembly and disassembly a more complicated operation.

SUMMARY OF THE INVENTION

A modular solid propellant rocket motor of improved design has now been found.

Accordingly an aspect of the present invention provides a modular rocket motor comprising:
a cylindrical housing having first and second ends, said first end having an inwardly curved rim;
a heat-resistant plastic liner for said cylindrical housing; and
a nozzle cap,
said liner being slidingly insertable into the cylindrical housing and said nozzle cap mating and being retained in said cylindrical housing.

Another aspect of the present invention provides a modular rocket motor comprising:
a cylindrical housing having first and second ends, said first end having an inwardly curved rim and said second end having internal threads;
a heat-resistant plastic liner for said cylindrical housing; and
a threaded nozzle cap,
said liner being slidingly insertable into the cylindrical housing and said threaded nozzle cap mating with the internal threads of said cylindrical housing.

In a preferred embodiment of the present invention, the modular rocket motor further comprises a bulkhead deployment cap adapted to slidingly engage in said liner, with an O-ring to effect a seal between said liner and said bulkhead deployment cap, the bulkhead deployment cap fitting within the cylindrical housing and being retained therein by said inwardly curved rim.

In embodiments, the heat-resistant plastic liner is integrally connected to the threaded nozzle cap, and in other embodiments it is separate.

In another embodiment, the modular rocket motor has one O-ring.

Yet another aspect of the present invention provides a modular rocket motor motor comprising:
a cylindrical housing having first and second ends, said first end having an inwardly curved rim;
a heat-resistant plastic liner for said cylindrical housing; and
a nozzle cap,
said liner being slidingly insertable into the cylindrical housing and said nozzle cap mating and being retained in said cylindrical housing,
said second end of the cylindrical housing having an annular internal groove with a slot in said groove extending through said housing, said nozzle cap having an annular groove cooperatively located with respect to the annular groove on the cylindrical housing, and a filament adapted to be reversibly drawn through said slot on rotation of the nozzle cap and retained in said cooperating annular grooves to effect mating of the cylindrical housing and nozzle cap.

A still further aspect of the present invention provides a nozzle cap with liner attached thereto for a modular rocket motor, said nozzle cap being colour coded to indicate the performance classification of the rocket motor, the performance classification being determined by the amount of propellant grain insertable into the liner.

BRIEF DESCRIPTION OF THE DRAWINGS

The present invention will be illustrated with respect to the embodiments shown in the drawings in which:

FIG. 1 shows a modular rocket motor which is loaded and ready for use. Modular rocket motor 1 has tubular motor casing 2 which extends for substantially the full length of rocket motor 1. Motor casing 2 has lining 3 therein, which is integrally connected to nozzle cap 4 such that nozzle cap 4 and lining 3 form the same piece. While it is likely that lining 3 and nozzle cap 4 would be manufactured in separate manufacturing steps, such pieces are joined together prior to use, using adhesives, spin welding or other suitable bonding techniques, and form a single part i.e. lining 3 and nozzle 4 are not separable into individual parts for the rocket motor. Lining 3 and nozzle cap 4 could be integrally moulded in the same forming operation.

Figure 1:
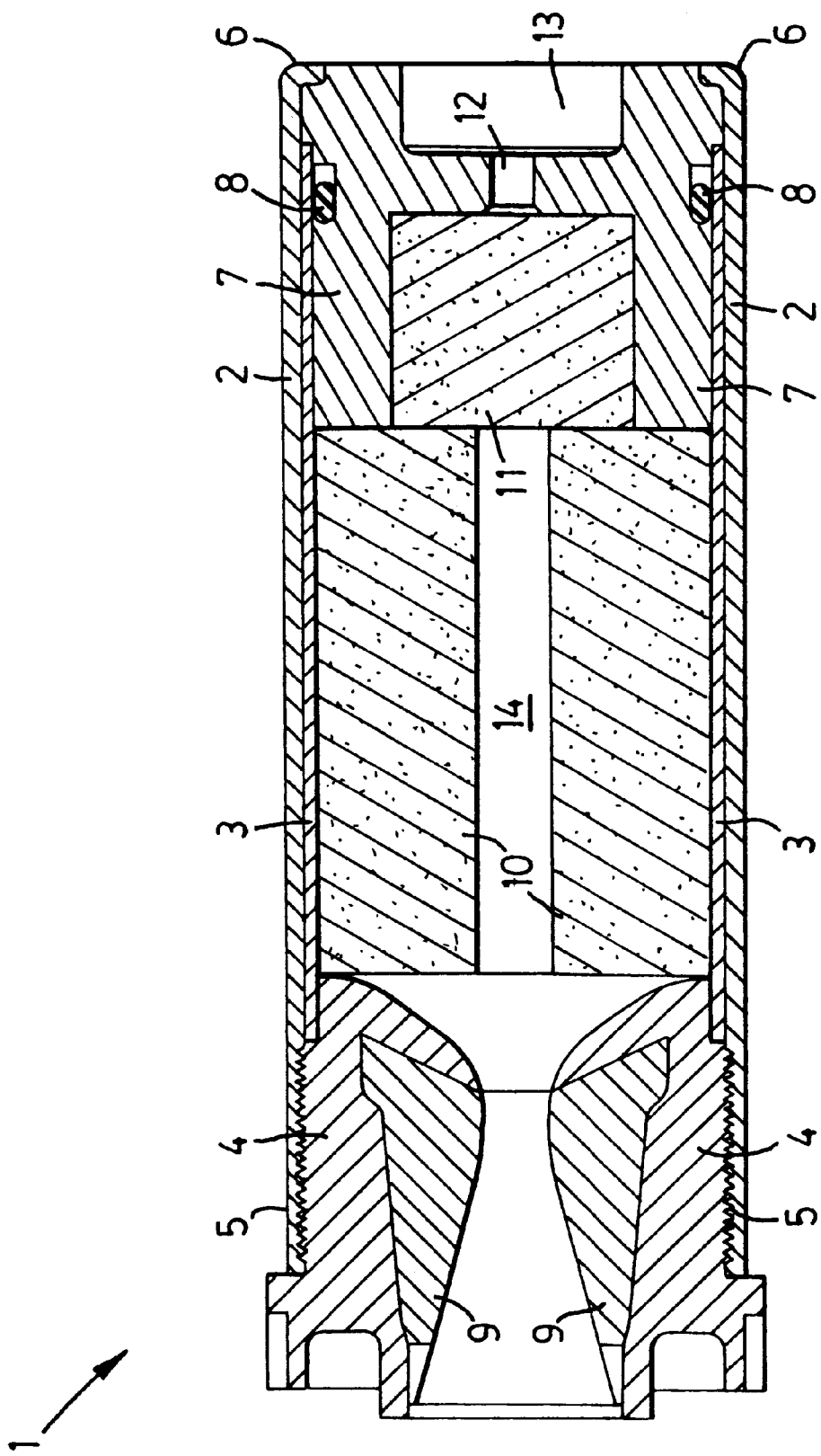
FIG. 1 is a schematic representation of a modular rocket motor.

Nozzle cap 4 has external threads thereon and motor casing 2 has cooperating threads thereon, both indicated by 5. The threaded section on nozzle cap 4 and on motor casing 2 permits nozzle cap 4 to be screwed into position in motor casing 2. Moreover, the integrally attached lining 3 on nozzle cap 4 means that nozzle cap 4 is piloted i.e. guided, into position as the result of lining 3 being inserted inside motor casing 2, thereby reducing or eliminating the likelihood of cross threading during insertion of nozzle cap 4 into motor casing 2.

The opposed end of motor casing 2 to that of threads 5 has curved rim 6. Curved rim 6 has an inward curve, being curved inward sufficiently to accept and retain bulkhead deployment cap 7. Bulkhead deployment cap 7 is inserted into motor casing 2 through the end of motor casing 2 having threads 5, to contact and be retained by curved rim 6. Bulkhead deployment cap 7 has O-ring 8 to effect a seal between bulkhead deployment cap 7 and lining 3. This is the only O-ring required in the modular rocket motor.

Nozzle cap 4 has nozzle 9 axially located therein. Between nozzle cap 4 and bulkhead deployment cap 7 is located one or more propellant grain 10. As described above, propellant grain 10 is a solid right cylindrical section of propellant with a central bore, 14, as is known, and is inserted into lining 3 as a solid section. Typically, propellant grain 10 is used in a form in which the propellant grain is contained in a sleeve of cardboard or other insulating material, which supports the grain and prevents burn between the grain and the casing.

As is illustrated hereinafter, more than one propellant grain 10 may be inserted into motor casing 2 depending on the respective lengths of motor casing 2 and propellant grain 10. Propellant grain 10 abuts bulkhead propellant delay grain 11, which is located within a cavity in bulkhead deployment cap 7. Bulkhead propellant delay grain 11 would normally be of a propellant that has a slower burn rate than propellant grain 10, as discussed below. Bulkhead channel 12 extends from bulkhead propellant delay grain 11 through bulkhead deployment cap 7 to grain chamber 13; although only a single channel is illustrated, multiple channels could be used and would have the advantage of less susceptibility to blockage of the channel to grain chamber 13. As discussed below, grain chamber 13 is used in deployment of a parachute.

The propellant grain disclosed in the drawings is commonly referred to as Bates grain. On ignition, the propellant will burn along central bore 14 and additionally burn along the ends of the propellant grain, including along interface areas between adjacent propellant grains. Such propellant grains and their effect on the consistency of thrust during a burn are known. Other types of propellant grains may be used, including star-grain, C-slot grain, and grains of other geometries, it being understood that the geometry will have effects on the thrust during a burn. Propellant grains are typically less than 62.5 g, although heavier grains may be used.

On the side facing propellant grain 10, nozzle cap 4 and nozzle 9 are shaped so as to provide support for propellant grain 10, and prevent it from falling downwards towards nozzle 9.

In preferred embodiments, the material used to fabricate nozzle 9 contains smoke-generating chemicals for tracing of the path of the rocket during flight, with the material of the nozzle ablating or otherwise being consumed during firing of the rocket to provide a continuous smoke trail. As discussed herein, bulkhead propellant delay grain 11 may also contain smoke-generating chemicals. Chemicals used for forming smoke for tracing of the rocket during flight include metallic zinc, chlorinated hydrocarbons and strontium carbonate, which give white, black and red trails, respectively. Other chemicals may be used.

Figure 2:
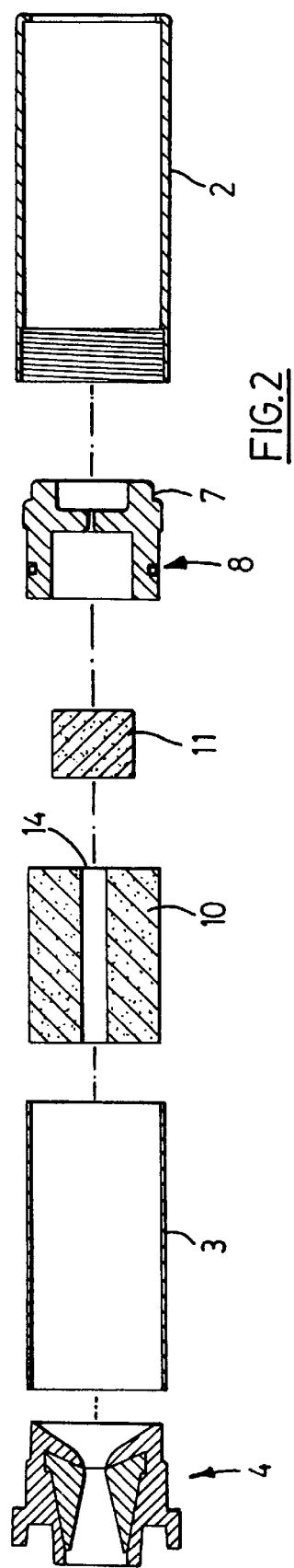
FIG. 2 is a schematic representation of the modular rocket motor of FIG. 1 in exploded view.

FIG. 2 shows the modular rocket motor, 1, in an exploded view. Modular rocket motor 1 has motor casing 2 and bulkhead deployment cap 7, which is adapted to be slidingly engaged in motor casing 2. Bulkhead deployment cap 7 has O-ring 8 thereon. Bulkhead propellant grain 11 fits into the cavity on the underside of bulkhead deployment cap 7. Motor casing 2 also has propellant grain 10 therein which is in slidingly engagement in lining 3. Lining 3 is shown as separate from nozzle cap 4; as discussed herein and shown in FIG. 2A, lining 3 could be integrally attached, including by being bonded to nozzle cap 4. Propellant grain 10 would normally be inserted into lining 3 prior to lining 3 being inserted into motor casing 2.

Figure 2A:
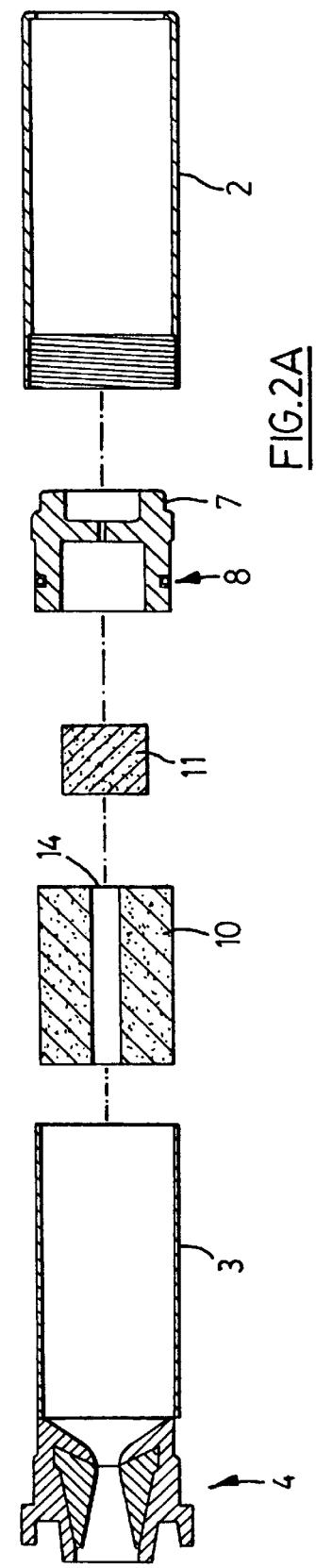
FIG. 2A is a schematic representation of an alternate modular rocket motor in exploded view.

FIG. 2A shows an alternate embodiment of the exploded view of the modular rocket illustrated in FIG. 2. In FIG. 2A, lining 3 is shown as attached to nozzle cap 4. Such attachment could be achieved by integrally forming lining 3 and nozzle cap 4 in a manufacturing process, or by forming lining 3 and nozzle cap 4 separately and subsequently joining by adhesives, welding or other bonding techniques.

Figure 3:
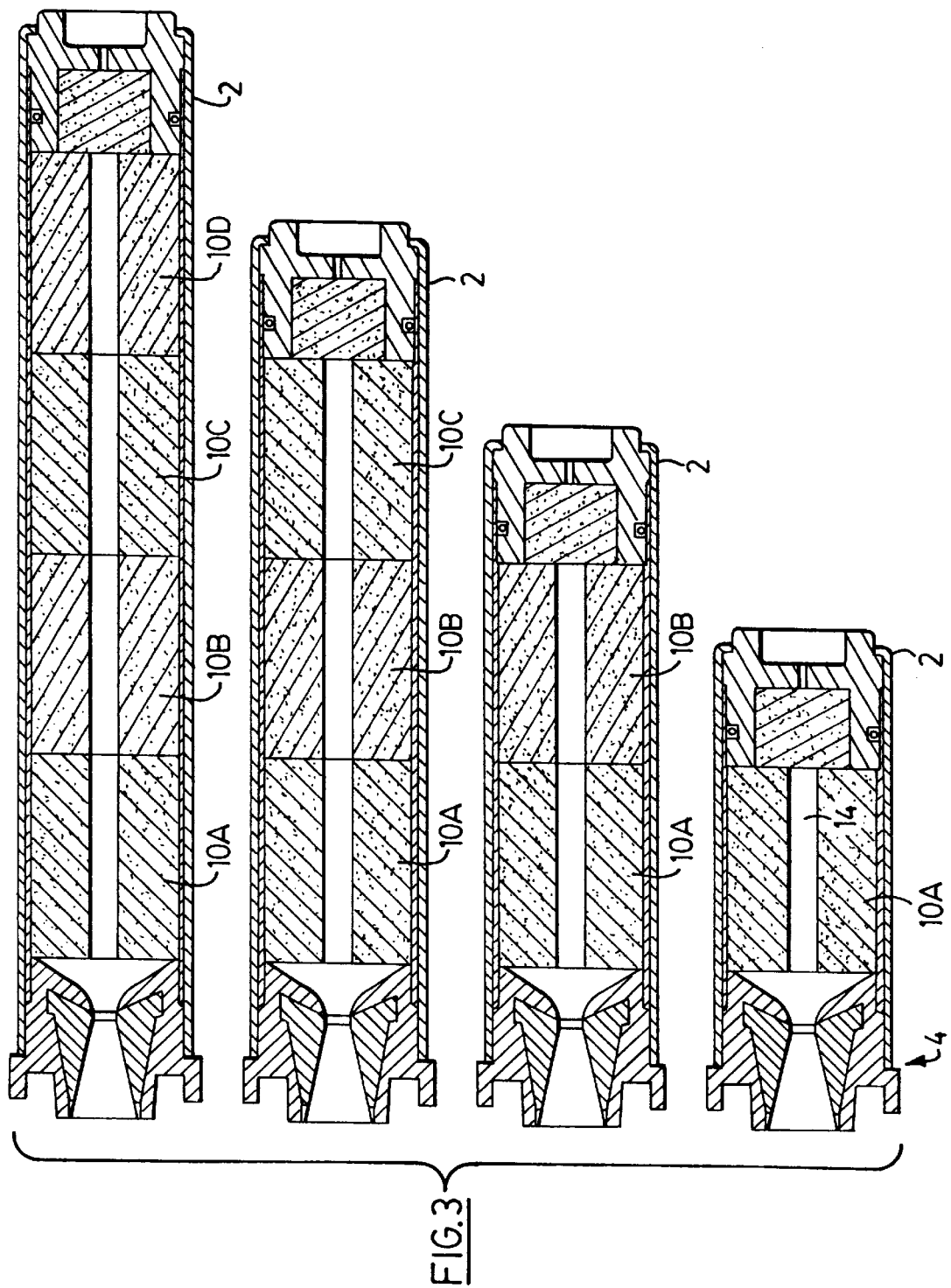
FIG. 3 is a schematic representation of four embodiments of modular rocket motors of the present invention.

FIG. 3 shows four embodiments of the modular motor rocket of the invention. The modular rocket motors are of the type described above, except that the motors contain different amounts of propellant grain. For instance, the lower (or shorter) modular rocket motor as illustrated in FIG. 3 has only one propellant grain, 10A. The adjacent modular rocket motor has two propellant grains, 10A and 10B. The third modular rocket motor has three propellant grains, 10A, 10B and 10C, and the upper modular rocket motor, as illustrated, has four propellant grains, 10A, 10B, 10C and 10D. It is to be understood that any convenient number of propellant grains could be used in a modular rocket motor. The remaining parts of the rocket motor could be interchangeable i.e. the bulkhead deployment caps shown in the four embodiments of FIG. 3 would normally be identical, with motor casing 2 and the corresponding section of liner 3 being of differing lengths. It will be appreciated that the nozzle would have a diameter that is related to, for example, burn rate and number of grains and thus may not be interchangeable.

In a preferred embodiment of the invention, the nozzle caps with attached lining of each of the four embodiments shown in FIG. 3 are of different colours i.e. nozzle cap 4 with lining 3 attached thereto are of different colours depending on the length of lining 3, thereby signifying the amount of propellant grain that may be inserted. As an example, nozzle cap and motor casing of the four embodiments shown in FIG. 3 could have different colours, e.g. yellow, green, blue and red, signifying the differing amounts of propellant grain and consequently the different classification of the rocket. Such use of differing colours is only practical in modular rocket motors having nozzle cap attached to a lining because the nozzle cap and lining would only fit into one length of motor casing 2. In modular rocket motors not having such a feature, i.e. with lining 3 being detached from nozzle cap 4, the same nozzle cap could be used in each modular rocket motor with different lengths of separate lining being inserted, with a consequence that any coloured nozzle cap could be used and such a colour could not signify the classification of the rocket.

The ability to utilize different colours to signify different classifications of the modular rocket motor, without error or deception, is an important aspect of the present invention. In particular, the use of nozzle caps with attached linings of differing colours is a significant safety consideration in the use of the modular rockets associated with the present invention.

Figure 4:
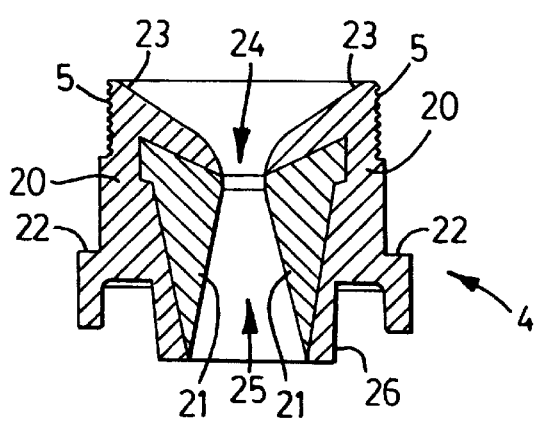
FIG. 4 and FIG. 4A are schematic representations of a nozzle cap corresponding to the embodiments of FIG. 2 and 2A.

FIG. 4 shows nozzle cap 4; lining 3 is not shown. Nozzle cap 4 has cap section 20 and nozzle section 21. Cap section 20 has external threads 5 thereon, which mate with the corresponding threads on the interior surface of motor casing 2. Cap section 20 has outer lip 22 which abuts onto motor casing 2 during assembly of the modular rocket motor. Cap section 20 further has inner face 23, which when assembled would contact propellant grain 10. Inner face 23 has a central bore therethrough, being cap bore 24, which extends through cap section 20, expanding in size to form nozzle exit 25. The cap described herein that is used in firing of the rocket would be placed on nozzle extension 26, although the primary purpose of nozzle extension 26 is to ensure that the hot gases passing from the nozzle 9 pass clear of nozzle cap 4 during firing.

Cap section 20 has nozzle section 21 recessed therein. Nozzle section 21 may be of a variety of shapes, which could affect the thrust characteristics of the modular rocket, and the performance thereof. Nozzle section 21 fits in an interior cavity in cap section 20 and may be inserted as a separate unit, being adhered to cap section 20. Alternatively, nozzle section 21 could be molded into cap section 20 during a manufacturing process. It is to be understood that nozzle section 21 is hollow, being substantially in the shape of a hollow cone, as the thrust from the rocket motor passes through cap bore 24 which is centrally located with respect to the nozzle section and passes downwardly therefrom, as illustrated, to provide the thrust for the rocket.

Figure 4A:
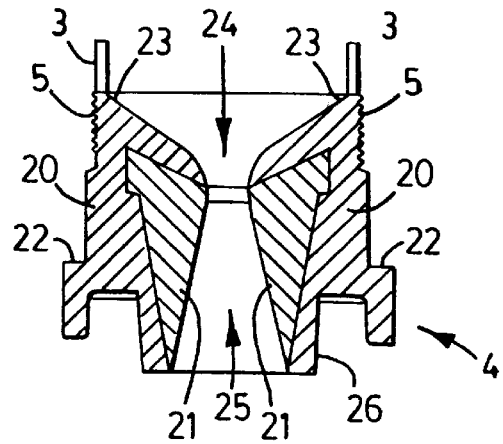

FIG. 4A shows the alternate embodiment of nozzle cap 4 in which the nozzle cap is bonded to lining 3.

Figure 5:
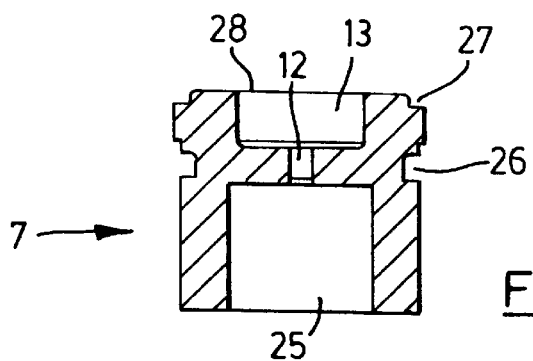
FIG. 5 is a schematic representation of a bulkhead deployment cap.

FIG. 5 shows bulkhead deployment cap 7, which has bulkhead chamber 25 facing in a downward direction as illustrated, which is towards the interior of motor casing 2, and grain chamber 13 on the opposed side. Bulkhead channel 12 extends between bulkhead chamber 25 and grain chamber 13. Bulkhead chamber 25 is intended to receive bulkhead propellant delay grain 11, discussed above, which would be in contact with propellant grain 10 in lining 3. In addition, bulkhead deployment cap 7 has O-ring groove 26 on the exterior thereof, in which O-ring 8 would fit. On the upper edge of bulkhead deployment cap 7 is rim lip 27, which is intended to abut curved rim 6 of motor casing 2, discussed above, to retain bulkhead deployment cap 7 within motor casing 2. In use, a grain cap 28 would be placed across grain chamber 13.

Figure 6:
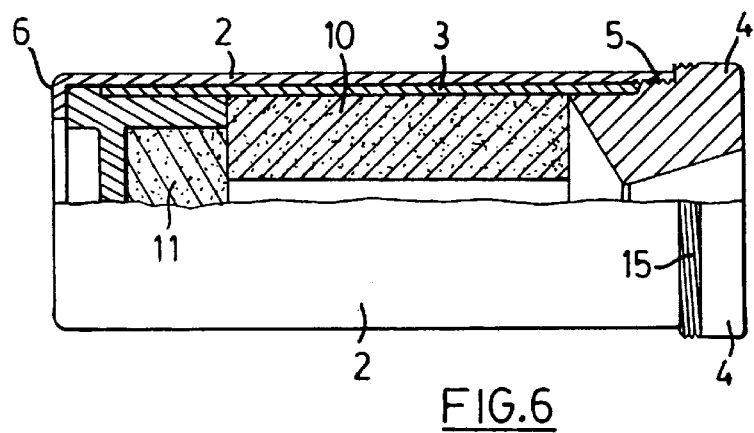
FIG. 6 is a schematic representation of a modular rocket motor partially in section.

FIG. 6 shows an embodiment of the invention in a partially sectioned view. The modular rocket motor has casing 2 with nozzle cap 4, lining 3, propellant grain 10, bulkhead propellant delay grain 11, arid bulkhead deployment cap 7 as described above. In the embodiment shown, nozzle cap 4 is separate from lining 3 but could be integrally formed or bonded thereto as described herein. Nozzle cap 4 has threads 5 for mating with corresponding threads internally located in casing 2. In the embodiment of FIG. 6, nozzle cap 4 additionally has external threads 15 thereon. External threads 15 are intended to permit the modular rocket motor to be attached, using matching internal threads to the body (air frame) of a rocket, and especially for attachment of fins to the modular rocket motor.

In assembly of the modular rocket motor, bulkhead deployment cap 7, with O-ring 8 thereon, is inserted into motor casing 2 such that rim lip 27 of bulkhead deployment cap 7 abuts curved rim 6 of motor casing 2. Bulkhead propellant grain 11 is then inserted into bulkhead deployment cap 7; in preferred embodiments, bulkhead propellant delay grain 11 is mould into bulkhead deployment cap 7. Propellant grain 10 is inserted into lining 3. Lining 3 with propellant grain 10 therein is then slid into motor casing 2, until such time that the threads 5 of nozzle cap 4 mate with the threads 5 of motor casing 2, at which time nozzle cap 4 is screwed to a tight fit. Propellant grain is then inserted into grain chamber 13, and grain cap 28 is placed over grain chamber 13. The resultant assembled modular rocket motor is then inserted into a rocket frame e.g. using the threads discussed above, and then armed using an ignition system.

Methods of igniting the propellant are known, and involve effecting ignition in the region of the propellant grain 10 and bulkhead propellant delay grain 11. Ignition may be achieved by inserting wires attached to ignitable material up the central bore of propellant grain 10 with leads extending out nozzle 9, with ignition being initiated electrically. Examples are known as electric matches or squibs. Pyrotechnical igniters are also known, and such igniters are deployed through bulkhead deployment cap 7. A cap is usually placed over the exit of nozzle 9, as discussed with respect to FIG. 4, to obtain an initial build-up of pressure at the time of firing of the rocket, and improve rocket take-off performance, such cap being blown (popped) off the nozzle by the pressure that is built up.

The modular rocket is then placed on at suitable launch site, as is known, and the rocket is fired by initiating ignition. At that time, propellant grain 10 burns with the thrust from the propellant grain passing through cap bore 24 and out through nozzle section 21, to provide thrust for the rocket. Ignition occurs remote from nozzle section 21, adjacent to bulkhead propellant delay grain 11. If Bates grain is used, propellant grain 10 burns within central bore 24 and at the ends of propellant grain 10, as discussed herein. Propellant grain 10 continues to burn, and provide thrust to the rocket, until all of the propellant grain 10 has been consumed. When bulkhead propellant delay grain 11 has been consumed, which is normally subsequent to propellant grain 10 being consumed, grain within grain chamber 13 ignites, which ruptures cap 28 and effects deployment of a parachute system (not shown), as is known. Cap 28 may be paper or plastic film cap.

Bulkhead propellant delay grain 11 has a delayed burn rate. In an aspect of the invention, the delayed burn rate may be adjusted shortly before firing of the rocket by reaming out the core of the end of bulkhead propellant delay grain 11 facing propellant grain 10. A keying device adapted to ream out bulkhead propellant grain delay 11 to leave uniform wall thicknesses may be used.

The motor casing 2 is formed from a suitable metallic material, thermoset or composite, including compression moulded and filament wound composites. The material of motor casing 2 should be light weight and aluminium is a preferred material.

Nozzle cap 4 and lining 3, as well as bulkhead deployment cap 7, are preferably made from a heat resistant plastic material. Examples of such plastics include phenolic plastics containing silica, ABS, polyamide, polyester, polyolefins, polyphenylenesulfide (PPS), polyvinylchloride, chlorinated polyvinylchloride, polycarbonate, polyacetal and other engineering polymers. For the nozzle, thermoset or suitable thermoplastic materials may be used, especially containing fillers of high temperature inorganic materials including silica, glass, carbon, ceramics and silicon carbide.

The modular rocket motor of the present invention eliminates aluminium to aluminium contact in threads, which occur on some other modular rocket motors. This eliminates possible metal/metal locking of threads during assembly of the modular rocket. In addition, the use of lining 3 and nozzle cap 4 as described herein means that the threading of nozzle cap 4 into motor casing 2 is piloted, thereby effectively eliminating cross threading.

The number of threads that are present on nozzle cap 4 and on motor casing 3 may be adjusted sc that in event of failure of the modular rocket motor for any reason e.g. as a result of blockage of cap bore 24, the rocket motor would undergo mechanical destruction by stripping of the threads. This would release pressure within the motor and prevent further build-up of pressure, thereby preventing the motor from exploding.

The modular rocket motor of the present invention has one O-ring and one threaded section, which provides all of the required gas retention properties. The use of lining 3 and nozzle cap 4 is an important factor in gas retention.

The use of lining 3 and nozzle cap 4 as described herein substantially improves the ease of fabrication of the modular rocket motor, and in particular reduces the amount of clean-up required. In particular, it is a simple operation to clean casing 2, if at all necessary, because it does not come in contact with propellant grain. Lining 3 and nozzle cap 4 could also be cleaned for re-use, especially as the typical cardboard liner is not used, which undergoes charring during firing of the rocket motor and causes difficulties in clean-up, although it may be more expeditious not to do so.

Figure 7:
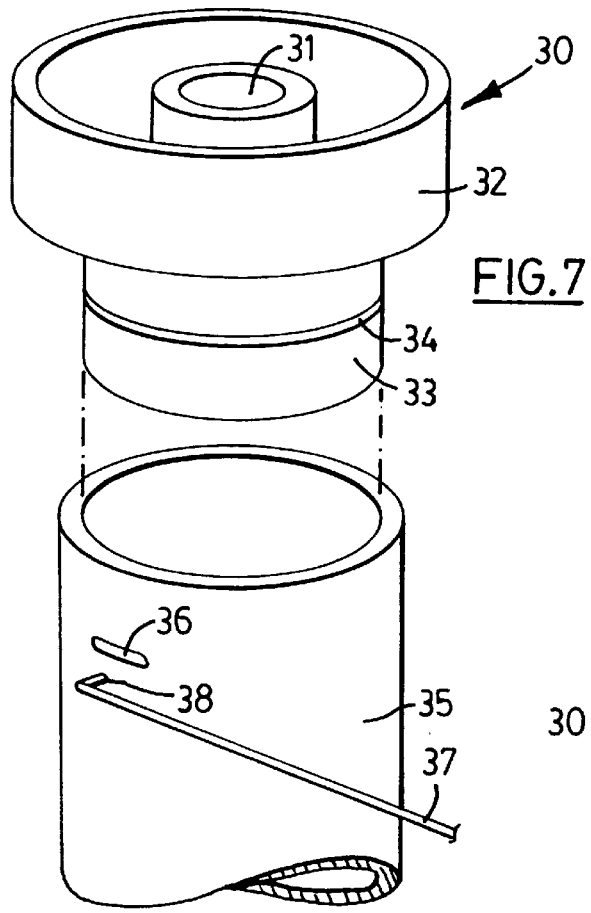
FIG. 7 is a schematic representation of an alternate method of attaching the nozzle cap to the casing, prior to attachment.

FIG. 7 shows an alternate embodiment of attaching a nozzle cap to the casing. Nozzle cap 30 has nozzle 31 and annular rim 32. Extending from nozzle cap 30 on the side opposed to nozzle cap 31 is shaft 33, it being understood that the nozzle would extend through nozzle cap 30. Shaft 33 has an annular groove 34. Casing 35 has slot 36 that is cooperatively located with respect to annular groove 34, and additionally has an interior annular groove located at slot 36 (not shown). Filament 37 has a diameter that will pass through slot 36. The end of filament 37 has knob 38 that when passed through slot 36 is adapted to engage in a knob receptacle (not shown) located in groove 34. Filament 37 has a length slightly less than the length of groove 34.

Figure 8:
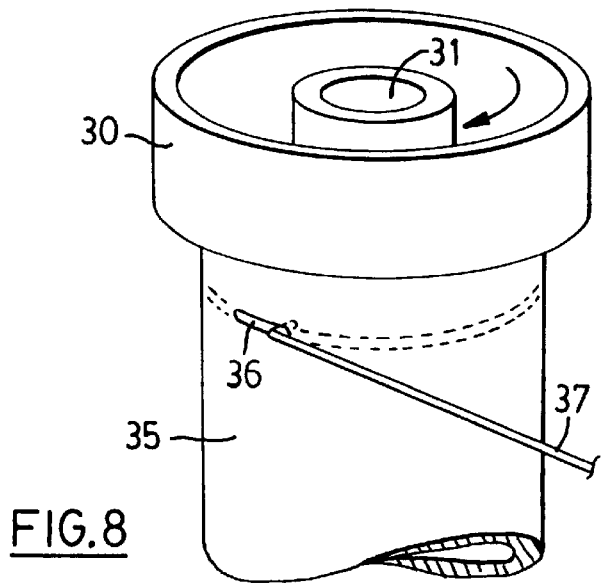
FIG. 8 is a schematic representation of an alternate method of attaching the nozzle cap to the casing, during attachment.

In use, nozzle cap 30 is inserted into casing 35. Filament 37 is inserted into slot 36, knob end first, and nozzle cap 30 is rotated so that knob 38 engages with the knob receptacle. Rotation of nozzle cap 30 draws all of filament 37 through slot 36, as it illustrated in FIG. 8, into annular groove 34. The diameter of filament 37, annular groove 34 and the internal annular groove in casing 35 are such that filament 37 fits into both grooves and locks nozzle cap 30 in position in casing 35. On reverse rotation of nozzle cap 30, filament 37 is forced out through slot 36 and may be removed from casing 35 thereby permitting nozzle cap 30 to be separated from casing 35.

In the event of failure of the rocket and increase in pressure within the rocket, as discussed above, the rocket motor with the filament means for attachment of the nozzle cap to the cylindrical housing would undergo mechanical destruction by stripping of the filament from the annular grooves in the nozzle cap and cylindrical housing. Thus, the filament and annular grooves would be of dimensions to retain the nozzle cap in the cylindrical housing during normal use but undergo mechanical destruction in the event of excessive pressure.

The modular rocket motor of the present invention can be used with standard propellant systems, or with more advanced propellant systems, without requiring any change in the parts of the modular rocket motor. The number of parts of the modular rocket motor has been substantially reduced, essentially requiring a bulkhead deployment cap with O-ring, nozzle cap and lining, and a nozzle section which also might be integrally formed during manufacture of the nozzle cap.

Bulkhead propellant delay grain 11 may be in the form of a time delay element formed of a composite elastomeric substance containing an under-oxidized fuel rich propellant having sufficient inhibitor such as rubber binder admixed therein to achieve the desired ignited delay. Metallic fuels such as tin or aluminium may be mixed with an excess of rubber binder and give satisfactory results.

A suitable rocket propellant for use in the modular rocket motor of the invention contains about 82% (w/w) of a suitable oxidizer e.g. ammonium perchlorate, with or without a metallic powder, and 18% of a synthetic rubber such as hydroxy-terminated polybutadiene, and like fuel flash binders.

Uses of the modular rockets of the invention include recreational uses. However, other uses include the seeding of clouds to generate rain or discharge electrical build up in storm clouds, and other meteorological uses. While the rockets may be built to reach considerable altitudes, many recreational rockets are intended to reach altitudes of about 20–30,000 feet.

What is claimed is:

1. A modular rocket motor comprising:
    a cylindrical housing having first and second ends, said first end having an inwardly curved rim and said second end having internal threads;
    a heat-resistant plastic liner for said cylindrical housing, said liner being slidingly insertable into the cylindrical housing;
    a threaded nozzle cap, said threaded nozzle cap mating with the internal threads of said second end of said cylindrical housing and being retained in said cylindrical housing; and
    a bulkhead deployment cap being adapted to slidingly engage in said liner, said bulkhead deployment cap having an O-ring to effect a seal between said liner and said bulkhead deployment cap, and said bulkhead deployment cap fitting within the cylindrical housing and being retained therein solely by said inwardly curved rim.

2. The modular rocket motor of claim 1 in which the heat resistant plastic liner is integrally connected with the threaded nozzle cap.

3. The modular rocket motor of claim 2 in which the heat resistant plastic liner is separate from the threaded nozzle cap.

4. The modular rocket motor of claim 2 in which the mating of threads is between metallic and non-metallic components.

5. The modular rocket motor of claim 2 in which the threading of the nozzle cap with the cylindrical housing is piloted when the liner is inserted into the cylindrical housing.

6. The modular rocket motor of claim 2 in which the modular rocket motor has one O-ring and one set of mating threads.

7. The modular rocket motor of claim 2 in which the modular rocker motor accommodates bulkhead propellant delay grain that has been reamed to determine delay in said motor.

8. The modular rocket motor of claim 2 in which a bulkhead propellant grain insulation is provided by the bulkhead deployment cap.

9. The modular rocket motor of claim 2 in which the threads between the second end and the nozzle cap will strip to effect relief of excessive pressure in the modular rocket motor.

10. The modular rocket motor of claim 2 in which external threads are provided for threaded attachment to a rocket.

11. The modular rocket motor of claim 2 in which the heat resistant plastic liner is integrally connected with the theaded nozzle cap.

12. The modular rocket motor of claim 11 in which the threading of the nozzle cap with the cylindrical housing is piloted when the liner is inserted into the cylindrical housing.

13. The modular rocket motor of claim 2 in which the heat resistant plastic liner is separate from the threaded nozzle cap.

14. The modular rocket motor of claim 2 in which the mating of threads is between metallic and non-metallic components.

* * * * *